(12) United States Patent
Smith et al.

(10) Patent No.: US 12,070,767 B2
(45) Date of Patent: Aug. 27, 2024

(54) ADHESIVE DISPENSING SYSTEM

(71) Applicant: TECHTRONIC CORDLESS GP, Anderson, SC (US)

(72) Inventors: Isiah Daniel Smith, Greenville, SC (US); Julia H. Moylan, Easley, SC (US); Carl N. Chandler, Greenville, SC (US); Neil Wright, Greenville, SC (US); Brandon Causey, Greenville, SC (US); Gabriel James Sandoval, Piedmont, SC (US); Margarete Ostermayer, Taylors, SC (US); Gian S. E. Thomas, Greenville, SC (US); Daniel Hernandez, Greenville, SC (US); Nicholas B. Schmidt, Greenville, SC (US); Halle Elliot, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/350,540

(22) Filed: Jul. 11, 2023

(65) Prior Publication Data

US 2023/0347376 A1    Nov. 2, 2023

Related U.S. Application Data

(62) Division of application No. 17/064,211, filed on Oct. 6, 2020, now Pat. No. 11,738,365.

(51) Int. Cl.
*B05C 17/005* (2006.01)
*G08B 5/36* (2006.01)

(52) U.S. Cl.
CPC ...... *B05C 17/0052* (2013.01); *B05C 17/0053* (2013.01); *G08B 5/36* (2013.01)

(58) Field of Classification Search
CPC ............ B05C 17/0052; B05C 17/0053; B05C 17/00546; B05C 17/00526; H05B 3/16; B05B 9/002; A45D 1/04; G08B 5/36
(Continued)

(56) References Cited

U.S. PATENT DOCUMENTS

| 4,354,092 A | 10/1982 | Manabe et al. |
| 4,857,702 A | 8/1989 | Cafaro |

(Continued)

FOREIGN PATENT DOCUMENTS

| CN | 202410926 U | 9/2012 |
| CN | 206276583 U | 6/2017 |

(Continued)

OTHER PUBLICATIONS

Extended European Search Report for Application No. 21200372.7 dated Mar. 21, 2022 (8 pages).

*Primary Examiner* — Charles P. Cheyney
(74) *Attorney, Agent, or Firm* — Michael Best & Friedrich LLP (57) ABSTRACT

A system including an adhesive dispensing device and a charger base. The adhesive dispensing device includes a first light emitting device, a handle, a power source, and a power supply interface. The charger base includes a second light emitting device, an interface formed for receiving the adhesive dispensing device, an external power output interface, and a power supply circuit. The external power output interface is configured to electrically couple to the power supply interface of the adhesive dispensing device. The first light emitting device is configured to illuminate in response to power being provided to the power supply interface from the power supply circuit. The second light emitting device is (Continued)

configured to illuminate in response to power being provided to the power supply circuit from the external power output interface.

10 Claims, 7 Drawing Sheets

(58) Field of Classification Search
USPC .............. 219/433, 533, 240, 225; 222/146.5, 222/146.2
See application file for complete search history.

(56) References Cited

U.S. PATENT DOCUMENTS

| | | | |
|---|---|---|---|
| 5,955,114 A * | 9/1999 | Llanos | G01F 11/026 222/391 |
| 6,321,945 B1 | 11/2001 | Girouard et al. | |
| 7,326,884 B1 * | 2/2008 | Anderson | A47J 9/001 222/402.15 |
| 8,056,764 B2 * | 11/2011 | Paasch | A47J 47/01 222/179.5 |
| 9,908,139 B2 | 3/2018 | Hsu | |
| 10,369,590 B2 * | 8/2019 | Seferi | B05C 17/0053 |
| 10,406,554 B2 * | 9/2019 | Seferi | B05C 17/0053 |
| 10,486,186 B2 * | 11/2019 | Belanger | B05C 5/0225 |
| 10,512,932 B2 * | 12/2019 | Seferi | B05C 17/00546 |
| 2003/0205566 A1 * | 11/2003 | Evanyk | B05C 17/0053 222/146.2 |
| 2005/0275378 A1 | 12/2005 | Canino et al. | |
| 2006/0081650 A1 | 4/2006 | Axinte et al. | |
| 2006/0191957 A1 * | 8/2006 | Axinte | B05C 17/00526 222/146.5 |
| 2006/0196888 A1 | 9/2006 | Agronin et al. | |
| 2016/0184848 A1 * | 6/2016 | Foreman | B05B 7/1693 239/13 |
| 2018/0056496 A1 | 3/2018 | Rubens et al. | |
| 2019/0222044 A1 | 7/2019 | Liu et al. | |
| 2019/0223640 A1 * | 7/2019 | Chen | A47G 19/26 |
| 2019/0227528 A1 * | 7/2019 | Abbott | G06N 20/00 |
| 2019/0350391 A1 | 11/2019 | Chen et al. | |

FOREIGN PATENT DOCUMENTS

| | | |
|---|---|---|
| DE | 8902455 U1 | 6/1989 |
| DE | 10217322 A1 | 11/2003 |
| KR | 20130026353 A | 3/2013 |
| WO | 199010264 A1 | 9/1990 |

* cited by examiner

ADHESIVE DISPENSING SYSTEM

RELATED APPLICATIONS

This application is a divisional application of U.S. patent application Ser. No. 17/064,211, filed Oct. 6, 2020, the entire content of which is hereby incorporated by reference.

FIELD

The present application relates to hand-held adhesive dispensers, commonly known as glue guns, that heat an adhesive for controlled discharge.

SUMMARY

In one embodiment, a system including an adhesive dispensing device and a charger base is described. The adhesive dispensing device includes a first light emitting device, a handle, a power source, and a power supply interface. The charger base includes a second light emitting device, an interface formed for receiving the adhesive dispensing device, an external power output interface, and a power supply circuit. The interface formed for receiving the adhesive dispensing device is configured to mate with the handle. The external power output interface is configured to electrically couple to the power supply interface of the adhesive dispensing device. The power supply circuit is coupled to the external power output interface and is configured to provide power to the external power output interface. The first light emitting device is configured to illuminate in response to power being provided to the power supply interface from the power supply circuit. The second light emitting device is configured to illuminate in response to power being provided to the power supply circuit from the external power output interface.

In another embodiment, a method for controlling one or more illuminate devices in an adhesive dispensing system is described. An adhesive dispensing device is electrically coupled to an adhesive dispensing device. The electrical coupling of the external power output interface and the power supply interface is recognized. In response to the recognition of the electrical coupling of the external power output interface and the power supply interface, at least one of a first light emitting device within the adhesive dispensing device and a second light emitting device within the charger base is illuminated.

In yet another embodiment, a system including an adhesive dispensing device and a charger base is described. The adhesive dispensing device includes a first light emitting device, a handle, a power source, a power supply interface, and a control circuit. The control circuit is configured to control the first light emitting device. The charger base includes a second light emitting device, an interface formed for receiving the adhesive dispensing device, an external power output interface, and a power supply circuit. The interface formed for receiving the adhesive dispensing device is configured to mate with the handle. The power supply circuit is coupled to the external power output interface and is configured to electrically couple to the power supply interface of the adhesive dispensing device based on the adhesive dispensing device being received in the interface. The first light emitting device is configured to illuminate in response to power being provided to the power supply interface from the power supply circuit. The second light emitting device is configured to illuminate in response to power being provided from the power supply circuit to the external power output interface.

Other aspects of the disclosed embodiments will become apparent by consideration of the detailed description and accompanying drawings.

DETAILED DESCRIPTION

Before any aspects of the herein disclosed technology are explained in detail, it is to be understood that the described embodiments are not limited in their application to the details of construction and the arrangement of components set forth in the following description or illustrated in the following drawings. The herein described embodiments are capable of other configurations and of being practiced or of being carried out in various ways.

Figure 1:
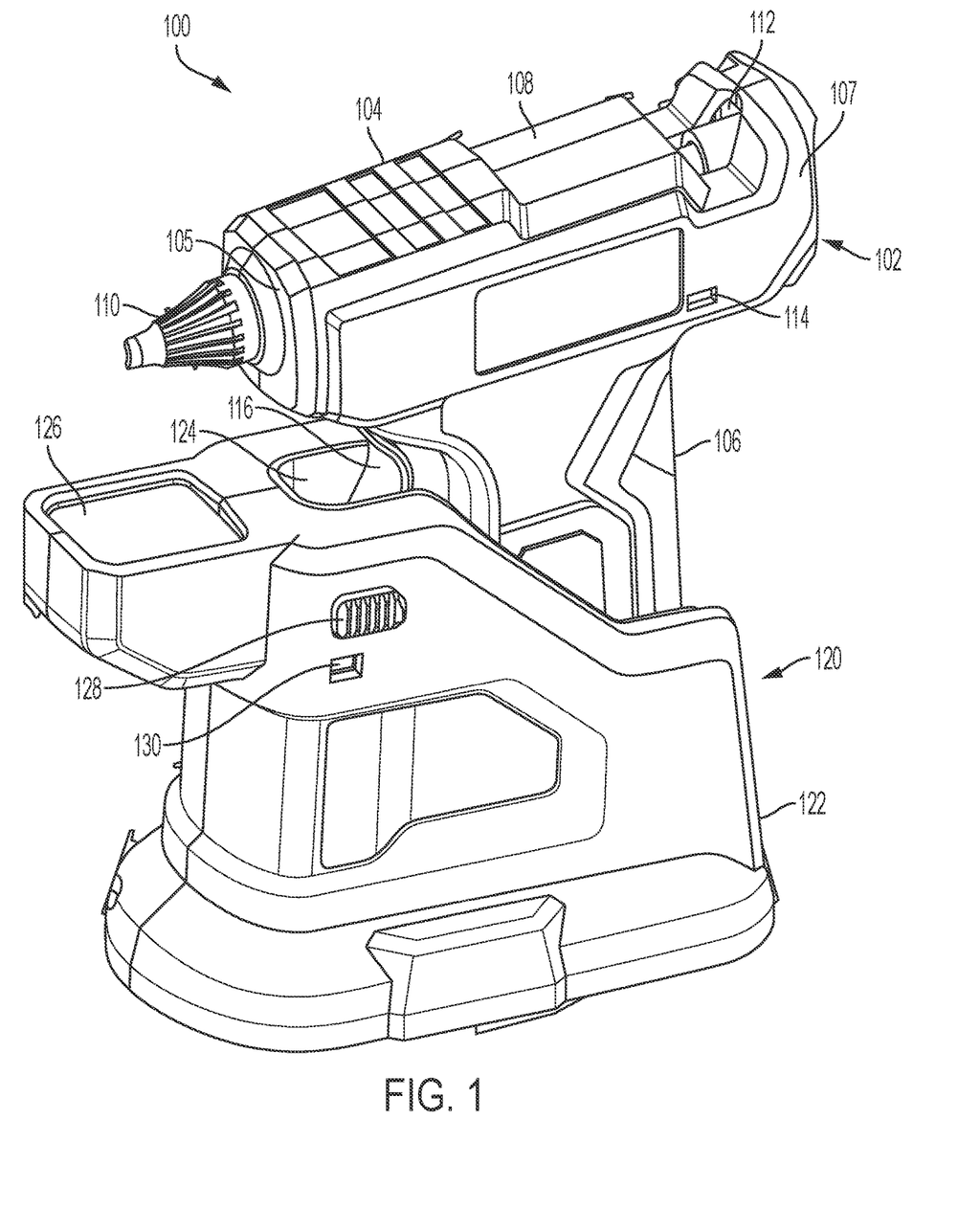
FIG. 1 is a perspective view of a glue gun and base according to some embodiments.

FIG. 1 illustrates an adhesive dispensing system 100 according to one embodiment of the present disclosure. The adhesive dispensing system 100 includes an adhesive dispensing device 102 and a charger base 120.

Figure 2:
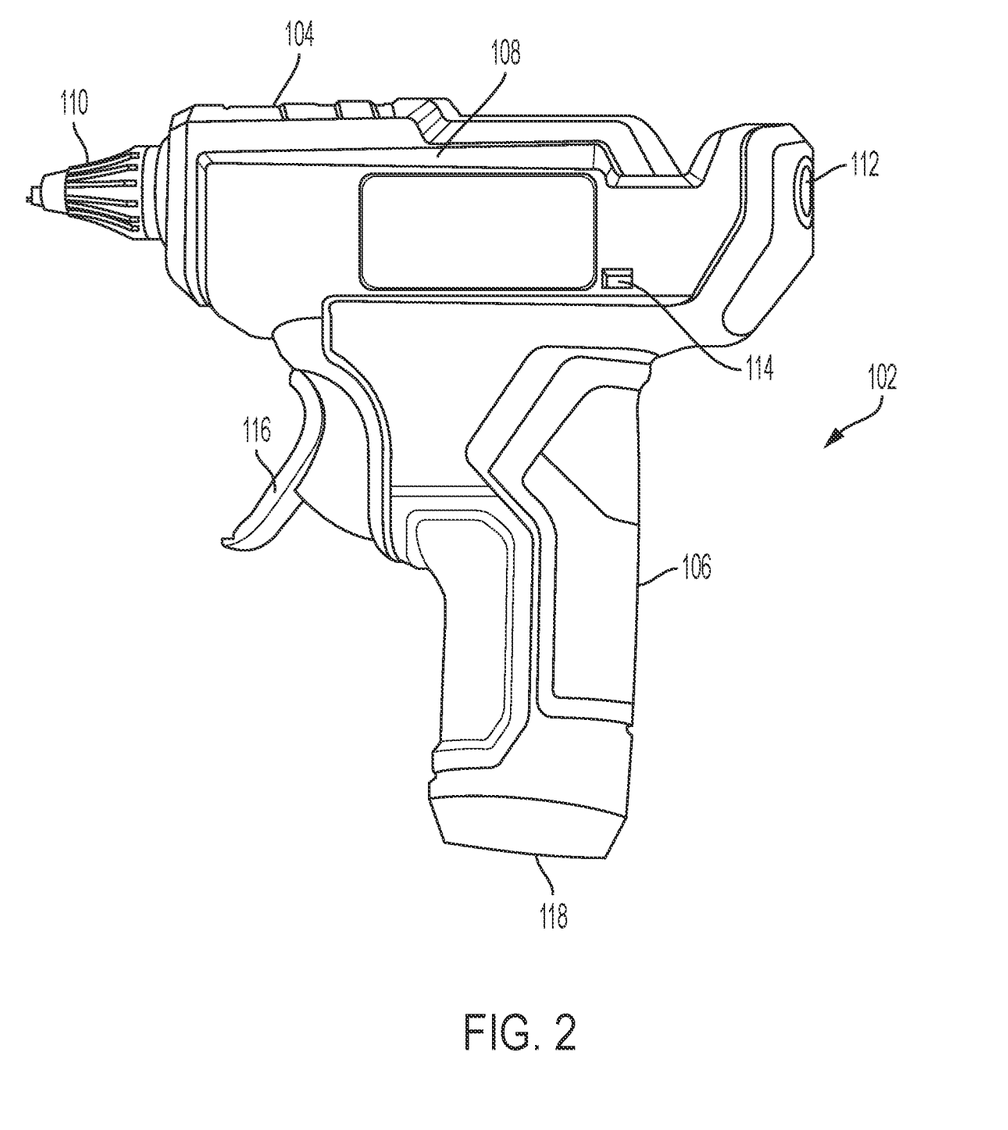
FIG. 2 is a side view of the glue gun of FIG. 1, according to some embodiments.

FIG. 2 illustrates the adhesive dispensing device 102 including a housing 104 having both a handle 106 and a barrel portion 108. The housing 104 has a first end 105 and a second end 107. The first end 105 is opposite of the second end 107 along the same lateral axis as the barrel portion 108. The barrel portion 108 is positioned generally atop the handle 106. A dispensing tip 110 is provided at the first end 105 of the housing 104 for dispensing liquid adhesive from the adhesive dispensing device 102. At the second end 107 of the housing 104, an aperture 112 is provided for receiving an adhesive. In one example, the adhesive is a solid adhesive. However, in other examples, the adhesive may be a liquid, such as a gel.

The housing 104 also includes a first light emitting device 114. In one embodiment, the first light emitting device 114 is a light emitting diode (LED). In some examples, the first light emitting device 114 includes one LED element. However, in other examples, the first light emitting device 114 may include multiple LED elements. For example, the first light emitting device 114 may include multiple LED elements configured to emit light at different wavelengths (i.e. colors).

The adhesive dispensing device 102 also includes a trigger 116 that is movably coupled to the handle 106. A power supply interface 118 is provided at the bottom end of the handle 106. The power supply interface 118 is configured to receive power from an external source, such as via the charger base 120. In one example, the power supply interface 118 is configured to receive a direct-current (DC) voltage, which can be used to supply power to one or more component of the adhesive dispensing device 102, as will be described below. However, in other embodiments, the power supply interface 118 is configured to receive an alternating current (AC) voltage.

Figure 3:
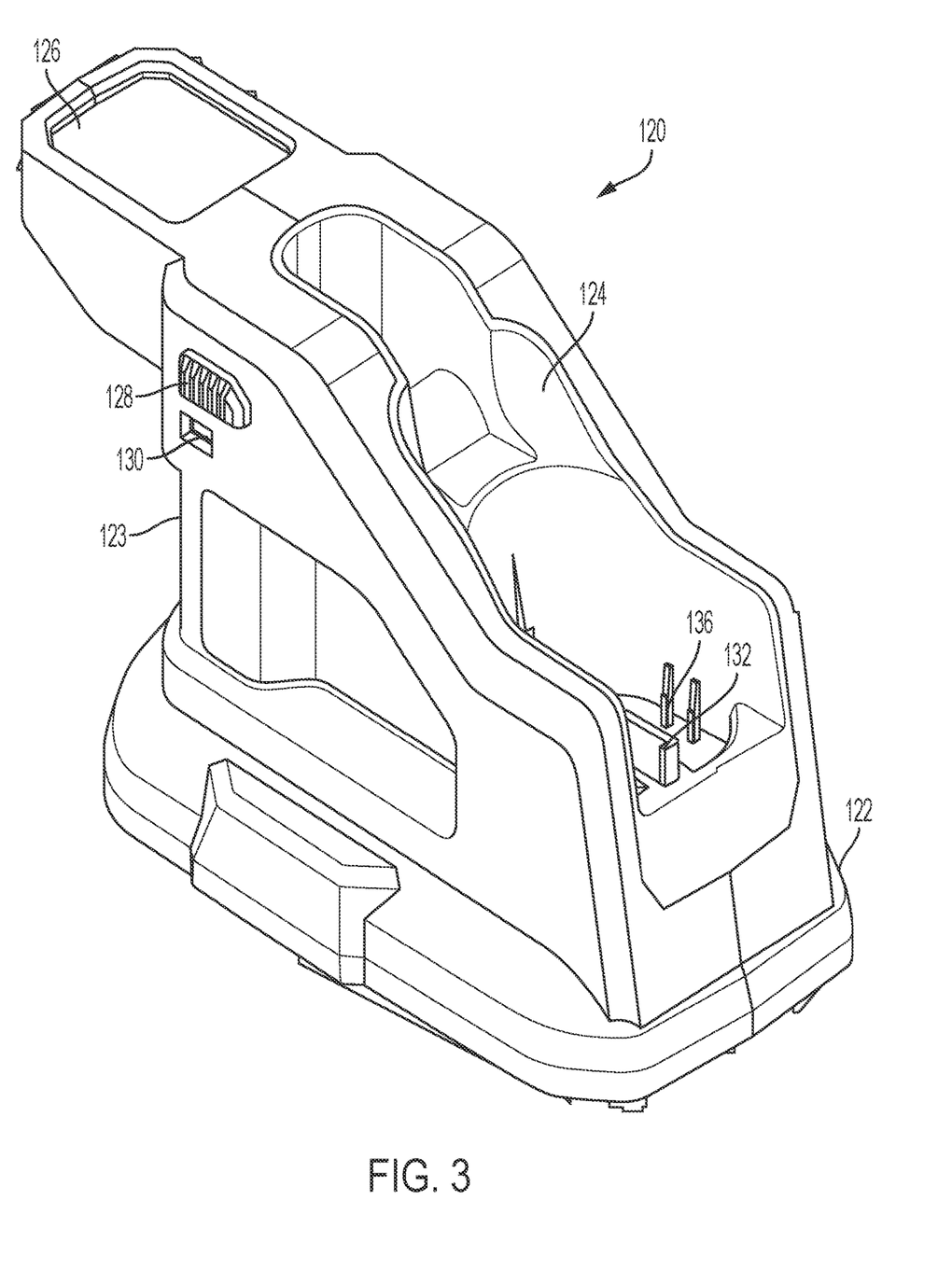
FIG. 3 is a perspective view of the base of the glue gun of FIG. 1.

FIG. 3 illustrates the charger base 120 including a base housing 122. The base housing 122 includes an interface 124, a drip shelf 126, a switch 128, a second light emitting device 130, and an external power output interface 132. The interface 124 is configured to receive and mate with the handle 106 of the adhesive dispensing device 102. The interface 124 allows the adhesive dispensing device 102 to be supported in an upright position as shown in FIG. 1. The interface 124 mates with the handle 106 of the adhesive dispensing device 102 to supply power to the adhesive dispensing device 102 through the electrical coupling of the power supply interface 118 and the external power output interface 132, as will be described below. In one embodiment, the interface 124 may include one or more electrical contacts 136, which are configured to interface with the power supply interface 118 of the adhesive dispensing device 102. The drip shelf 126 is provided at the forward end 123 of the base housing 122 and is generally parallel to the dispensing tip 110. The drip shelf 126 provides a surface to collect adhesive that is expelled from the dispensing tip 110 when the adhesive dispensing device 102 is received by the interface 124.

Figure 4:
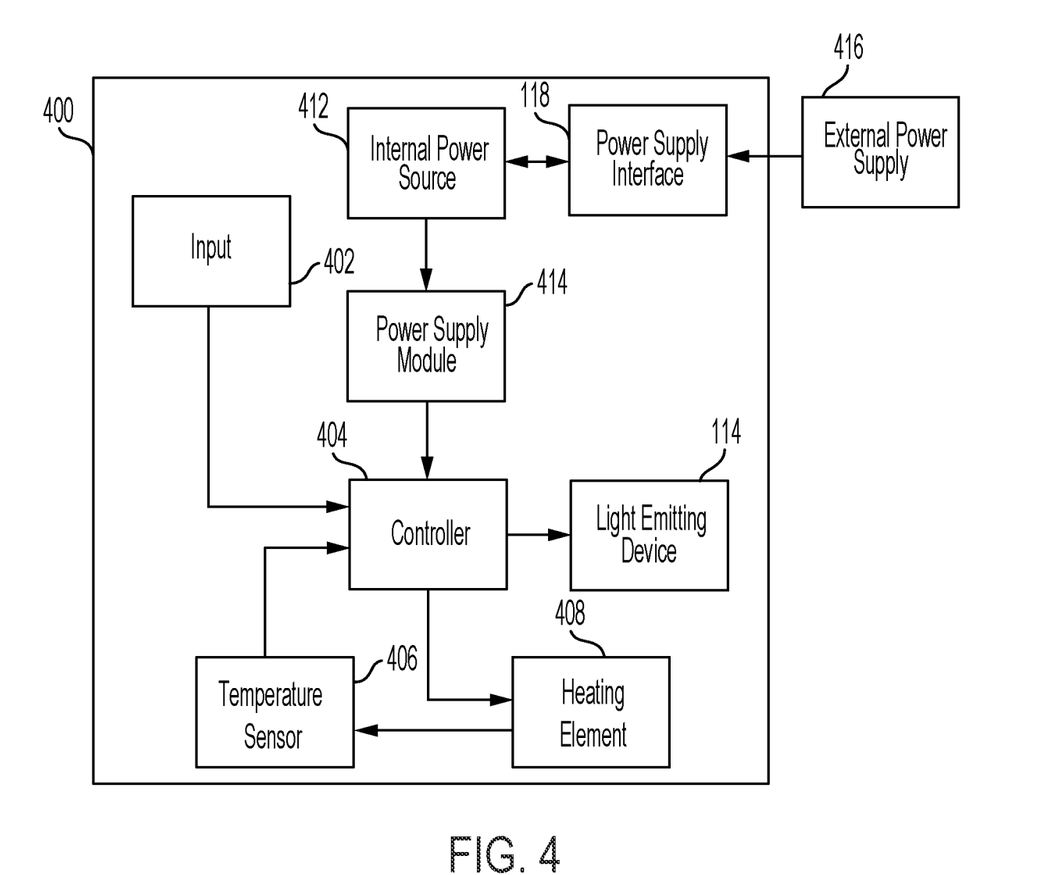
FIG. 4 is a block diagram illustrating an electrical circuit of the glue gun of FIG. 1, according to some embodiments.

FIG. 4 illustrates an electrical schematic of the adhesive dispensing device 102, according to some embodiments. As shown in FIG. 4 the adhesive dispensing device 102 includes a control system 400. The control system 400 includes an input 402, a controller 404, a temperature sensor 406, a heating element 408, the first light emitting device 114, an internal power source 412, a power supply module 414, a power supply interface 118, and an external power supply 416.

The controller 404 includes electrical and electronic components that provide power, operational control, and protection to the components and modules within the control system 400 and/or the adhesive dispensing device 102. Specifically, the controller 404 may include, among other things, a processing unit (e.g., a microprocessor, a microcontroller, electronic processor, electronic controller, or another suitable programmable device), a memory, sensors, input circuits, and output circuits. The controller 404 interfaces with the power supply module 414 to receive data regarding the flow of power to the internal power source 412. The controller 404 may receive an input via the input 402. In one embodiment, the input 402 may be when the trigger 116 is actuated. In another embodiment, the input 402 may be when a power switch (not shown) is switched to an "on" position. When an input is received by the controller 404, the controller 404 controls the heating element 408 such that the heating element 408 generates heat. In some embodiments, the controller 404 may control how much power flows to the heating element 408 to control the amount of heat generated by the heating device. For example, the controller 404 may control the amount of power provided to the heating element 408 by controlling one or more power circuits, such as power circuits utilizing solid state switching control (e.g. a MOSFET switched power circuit). In other embodiments, other power circuits, such as relays, are used to control the flow of power to the heating element 408, or other power circuit devices.

The controller 404 is electrically coupled to the temperature sensor 406 to receive temperature data associated with the heating element 408. In one embodiment, the temperature sensor 406 provides an analog signal to the controller 404 representing the temperature data. In other embodiments, the temperature sensor 406 may provide one or more digital signals to the controller 404 to represent the temperature data. The temperature sensor 406 is configured to interface with the heating element 408 to determine a temperature of one or more portions of the heating element 408. In some embodiments, a temperature of the heating element is determined without the use of a temperature sensor. For example, the controller 404 may be configured to calculate a temperature of the heating element 408 based on an amount of current provided to the heating element. The current provided to the heating element may be the current output from the internal power source, which is communicated to the controller 404, or another sensed current. In some examples, the controller 404 may sense a change in current though a temperature-dependent resistor, such as a Positive Temperature Coefficient ("PTC") thermistor (not shown), that corresponds to a change in temperature of the heating element 408. The above examples are for exemplary purposes only, and other configurations or components can be used to determine a temperature of the heating element without the use of a temperature sensor configured to provide temperature data to the controller 404.

In one embodiment, the heating element 408 is configured to, upon activation by the controller 404, heat a solid adhesive to a temperature that converts it to a liquid adhesive, which may then be dispensed through the dispensing tip 110. Activation by the controller 404 occurs when the controller 404 receives an input 402, such as an input from the trigger 116. In one embodiment, the heating element 408 heats the dispensing tip 110, which may then heat the solid adhesive as it is forced into the dispensing tip 110 by actuation of the trigger 116.

As shown in FIG. 4, the power supply interface 118 is also electrically coupled to an internal power source 412. The internal power source 412 provides power to the adhesive dispensing device 102. In one embodiment, the internal power source 412 is a rechargeable battery, such as a rechargeable Lithium-Ion (Li-Ion) battery. However, in other embodiments the internal power source 412 may be other rechargeable battery types, such a lead-acid, Nickle-Cadmium, etc. In one embodiment, the internal power source 412 may receive power via the power supply interface 118. The internal power source 412 receives power via the power supply interface 118 when the power supply interface 118 is electrically coupled to the external power supply 416. The external power supply 416 may be power that is received from the external power output interface 132. Power from the external power output interface 132 received via the power supply interface 118 may charge the internal power source 412. The internal power source 412 is coupled to the power supply module 414, which is in communication with the controller 404. The power supply module 414 communicates to the controller 404 that an electrical connection with the charger base 120 has been established and that power is flowing to the internal power source 412. The internal power source 412 provides power to the controller 404. In other embodiments, the internal power source 412 may provide power to the power supply module 414, which may then provide power to one or more components of the control system 400, such as the controller 404.

In one embodiment, the controller 404 is configured to control at least the first light emitting device 114 of the adhesive dispensing device 102. The first light emitting device 114 of the adhesive dispensing device 102 and the second light emitting device 130 of the charger base 120 may be configured to illuminate when the power supply interface 118 is electrically coupled to an external power supply 416. In one example, the first light emitting device 114 of the adhesive dispensing device 102 and the second light emitting device 130 of the charger base 120 illuminate using the same color. However, in other examples, the first light emitting device 114 of the adhesive dispensing device 102 and the second light emitting device 130 of the charger base 120 illuminate using different colors. Example colors may include red, blue, green, white, and the like.

Figure 5:
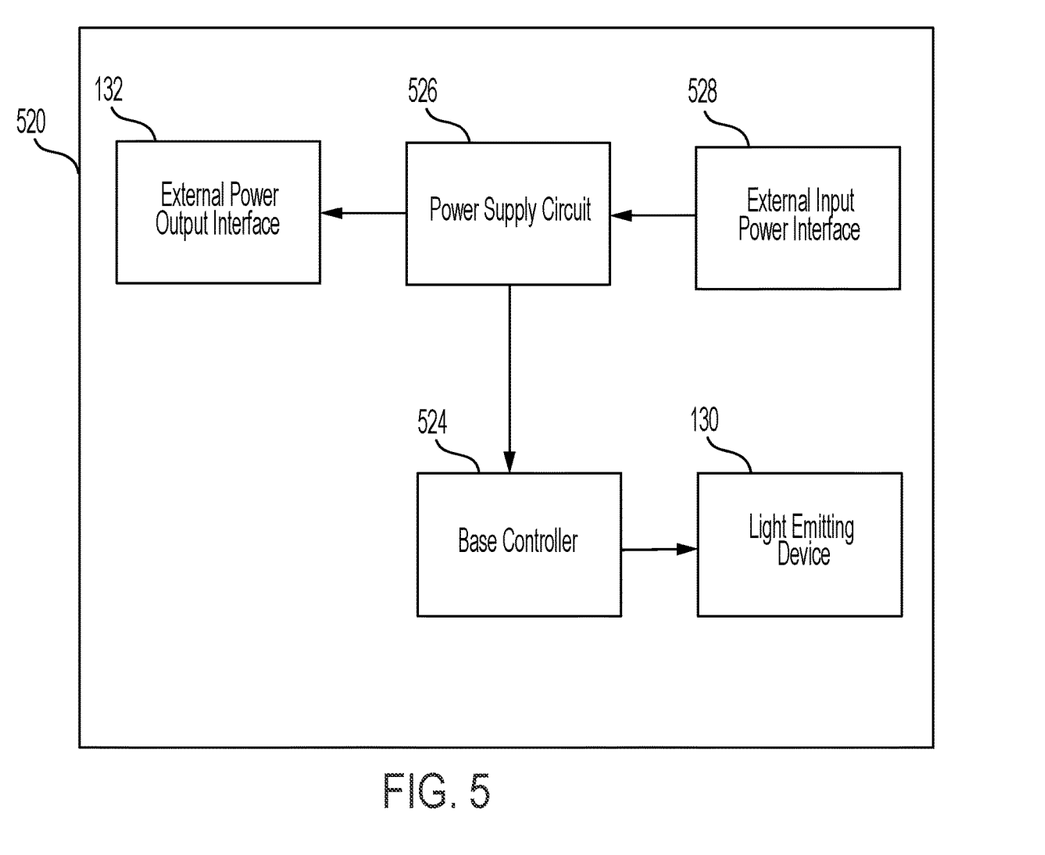
FIG. 5 is a block diagram illustrating an electrical circuit of the base of FIG. 1, according to some embodiments.

FIG. 5 illustrates an electrical schematic of the charger base 120, according to some embodiments. As shown in FIG. 5, the charger base 120 includes a control system 520. In one embodiment, the charger base 120 includes an external power output interface 132, a base controller 524, one or more second light emitting device 130, a power supply circuit 526, and an external input power interface 528.

The external input power interface 528 can be one of a battery, an AC power source (e.g. utility power), a DC power source (e.g. a rectified AC signal), etc. Power is provided to the control system 520 via the external input power interface 528 and is regulated by the power supply circuit 526. The power supply circuit 526 is coupled to the base controller 524 and the external power output interface 132. In one embodiment, the base controller 524 is configured to control the illumination of the second light emitting device 130, as further described below.

In one embodiment, the external power output interface 132 is configured to interface with an external device, such as the adhesive dispensing device 102, described above. The external power output interface 132 interfaces with the power supply interface 118 of the adhesive dispensing device 102 via an electrical connection. For example, electrical contacts 136 on the charger base 120 may interface with one or more electrical contacts on the adhesive dispensing device 102. The electrical connection allows for power to flow from the charger base 120 to the adhesive dispensing device 102. The electrical connection is recognized by the power supply module 414. In some examples the power supply module 414 may act as a sensor. The power supply module 414 may be in communication with sensors that sense the electrical connection. The sensors may be a voltage sensor, a current sensor, etc. In one embodiment, the power supply module 414 recognizes the flow of power to the internal power source 412 and communicates to the controller 404 that power is flowing.

Figure 6:
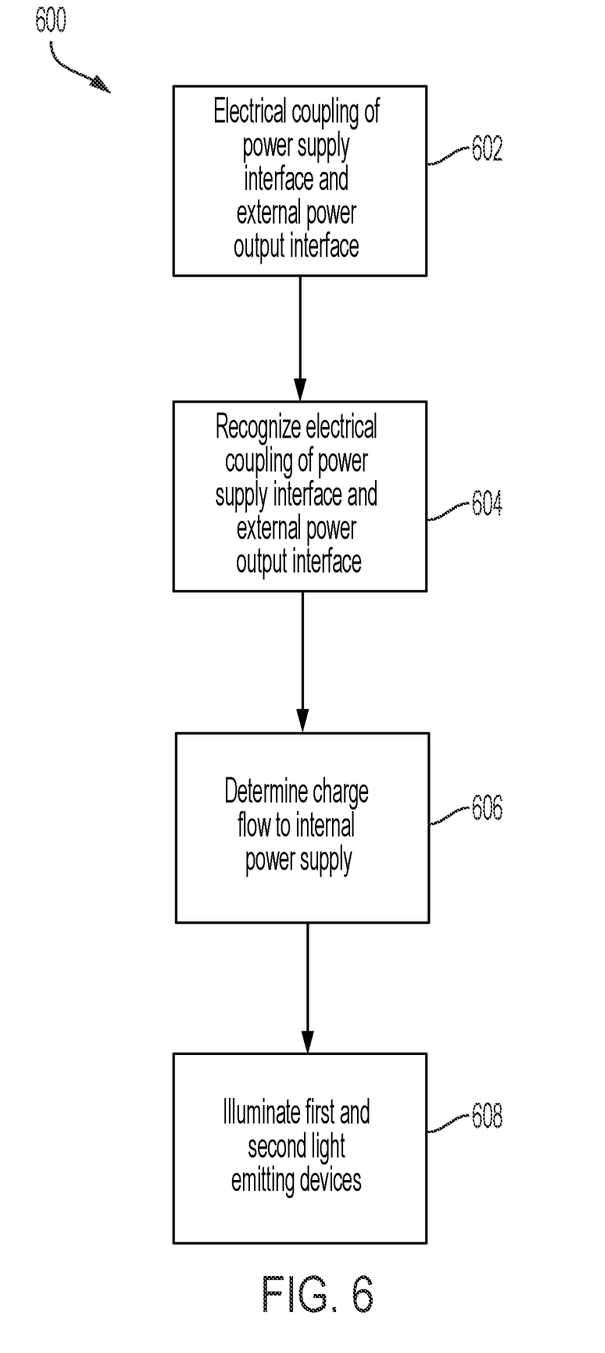
FIG. 6 is a flowchart illustrating a process for controlling the illumination of a light source on an adhesive dispenser, according to some embodiments.

FIG. 6 illustrates a flowchart of a process 600 for controlling one or more light emitting devices associated with an adhesive dispensing system, such as the adhesive dispensing system 100 described above. At block 602, the interface 124 on the charger base 120 receives the handle 106 of the adhesive dispensing device 102. The power supply interface 118 is brought into electrical contact with the external power output interface 132, via the electrical contacts 136 described above. At block 604, the control system 400 of the adhesive dispensing device 102 and the control system 520 of the charger base 120 recognize the electrical coupling of the power supply interface 118 and the external power output interface 132. The controller 404 recognizes the electrical coupling through the power supply module 414, as described above. The base controller 524 recognizes the electrical coupling through the power supply circuit 526 which communicates that electrical coupling has occurred to the base controller 524. At block 606, the control system 400 determines that charge is flowing to the internal power source 412. The power supply module 414 communicates the determination of charge flow to the controller 404. At block 608, the controller 404 and the base controller 524 are configured to illuminate the first light emitting device 114 and the second light emitting device 130, respectively, in response to determining that there is charge flowing to the internal power source 412. In one embodiment, the controller 404 communicates the determined power flow to the base controller 524. For example, controller 404 may communicate to the base controller 424 via a wired connection, such as via electrical contacts 136. However, in some examples, the communication between the controller 404 and the base controller 524 may be done via a wireless communication protocol, such as Bluetooth, RF, Wi-Fi, etc.

In another embodiment, the base controller 524 may determine that charge is flowing to the internal power source 412.

In yet another embodiment, the controller 404 and the base controller 524 are configured to illuminate the first light emitting device 114 and the second light emitting device 130, respectively, in response to determining that there is charge flowing to the internal power source 412 and in response to the base controller 524 determining that the power supply circuit 526 is supplying power to the external power output interface 132.

Figure 7:
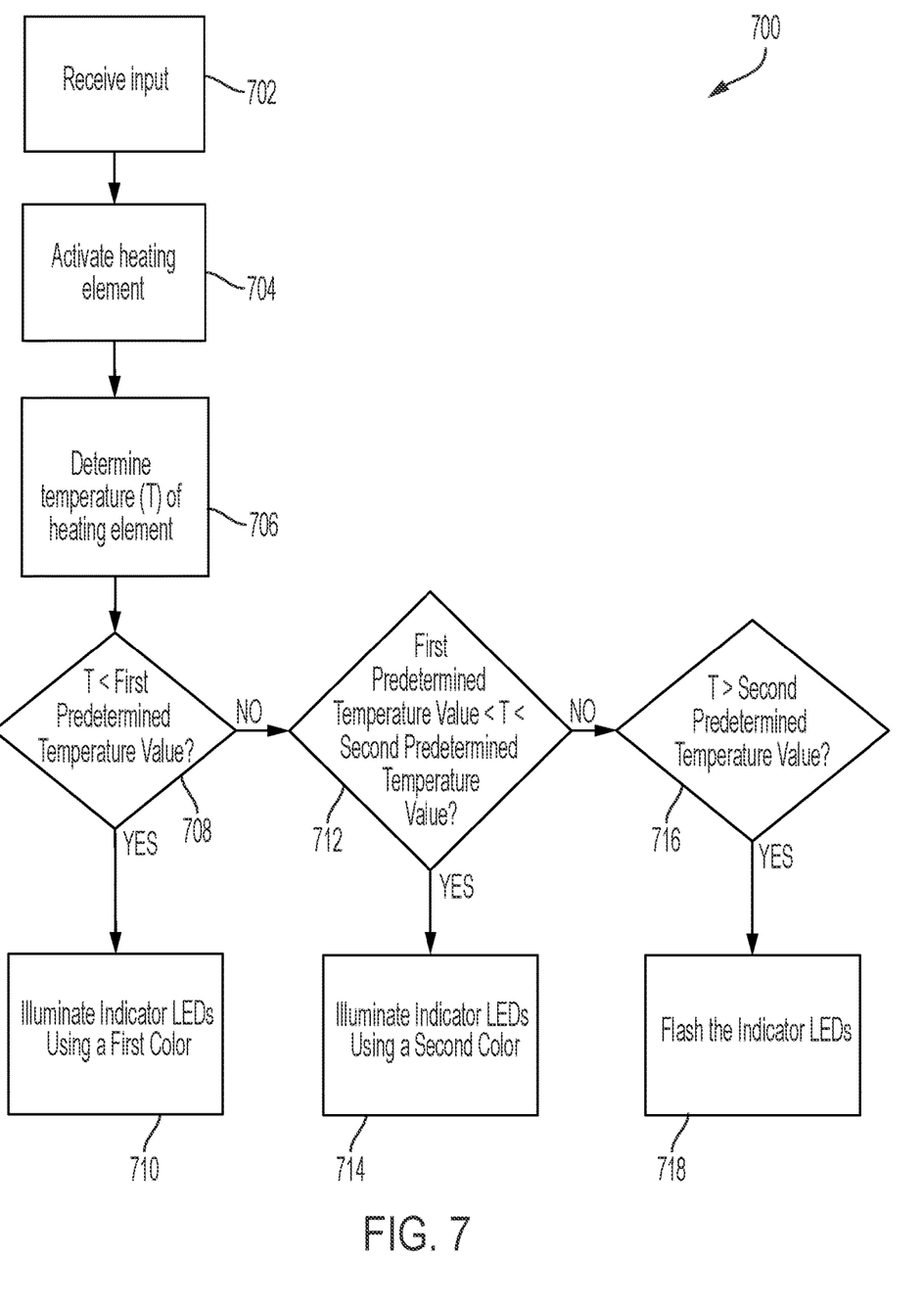
FIG. 7 is a flowchart illustrating a process for controlling the illumination and color of illumination of a light source on an adhesive dispenser, according to some embodiments.

FIG. 7 is a flowchart illustrating a process 700 for illuminating one or more of the first light emitting device 114 and the second light emitting device 130 based on a sensed temperature. At block 702, the controller 404 receives an input 402. In one embodiment, the input 402 may be received when the trigger 116 is actuated. In another embodiment, the input 402 may be received when a power switch (not shown) is switched to the "on" position. At block 704, the controller 404 activates the heating element 408. When activated, the heating element 408 emits heat to change the solid adhesive to liquid as the solid adhesive comes into proximity of the heating element 408. At block 706, the controller 404 determines a temperature of the heating element 408. In one embodiment, the controller 404 receives temperature data from the temperature sensor 406 indicating the temperature of the heating element 408. In some examples, the controller 404 is configured to calculate a temperature of the heating element 408 based on an amount of current provided to the heating element 404. The current provided to the heating element may be the current output from the internal power source, which is communicated to the controller 404, or another sensed current. In some examples, the controller 404 may sense a change in current though a temperature-dependent resistor, such as a PTC thermistor (not shown), that corresponds to a change in temperature of the heating element 408.

The controller 404 is configured to interpret the determined temperature data by comparing it to a first predetermined temperature value, as described in block 708. In response to the temperature data being less than the first predetermined temperature value, then the process proceeds to block 710. In response to the temperature data being greater than the first predetermined temperature value, the process proceeds to block 712. At block 710, in response to the controller 404 interpreting the temperature data as being below the first predetermined temperature value and the controller 404 communicating the determined temperature to the base controller 524, the controller 404 and the base controller 524 are configured to control at least one of the first light emitting device 114 and the second light emitting device 130 to produce light having a first color. In one embodiment, the controller 404 may communicate to the base controller 424 via a wired connection, such as via electrical contacts 136. However, in some examples, the communication between the controller 404 and the base controller 524 may be done via a wireless communication protocol, such as Bluetooth, RF, Wi-Fi, etc. In one embodiment, the first color is blue. However, other colors may be used for the first color, such as red, purple, green, etc.

If the process 700 does not proceed to block 710, then the process 700 proceeds to block 712. At block 712, the controller 404 interprets the determined temperature data to see if the temperature is between the first predetermined temperature value and the second predetermined temperature value. If the temperature data meets the criteria of block 712, then the process 700 proceeds to block 714. If the temperature data does not meet the criteria of block 712, then the process 700 proceeds to block 716. If the process 700 proceeds to block 714, at least one of the first light emitting device 114 and the second light emitting device 130 illuminate to a second color. In one embodiment, the second color is yellow, indicating a temperature between the first predetermined temperature value and the second predetermined temperature value.

If the process 700 does not proceed to block 714, then the process 700 proceeds to block 716. At block 716, the controller 404 interprets the determined temperature data to see that the received temperature data is greater than the second predetermined temperature value. At block 718, in response to the controller 404 interpreting temperature data from the temperature sensor 406 that is above the second predetermined temperature value, at least one of the first light emitting device 114 and the second light emitting device 130 alternate between an ON state and an OFF state (i.e. flashing). Alternating between an ON state and an OFF state may indicate an overheated state of the adhesive dispensing device 102. In one embodiment, the flashing illumination may be of the color white.

In one embodiment, the first temperature may be 120° Celsius. However, temperatures of more than 120° Celsius and less than 120° Celsius are also contemplated. The second temperature may be 140° Celsius. However, temperatures of more than 140° Celsius and less than 140° Celsius are also contemplated.

Various features and advantages of the invention are set forth in the following claims.

What is claimed is:

1. A method for controlling one or more illuminate devices in an adhesive dispensing system, the method comprising:
   electrically coupling an adhesive dispensing device and a charger base, the charger base including an interface formed for receiving the adhesive dispensing device;
   determining an electrical connection between an external power output interface of the charger base and a power supply interface of the adhesive dispensing device;
   in response to determining the electrical connection between the external power output interface and the power supply interface, illuminating at least one of a first light emitting device coupled to the adhesive dispensing device and a second light emitting device coupled to the charger base; and
   controlling, via a control circuit of the adhesive dispensing device, a flow of power from a power source of the adhesive dispensing device to a heating element coupled to a nozzle of the adhesive dispensing device in response to the adhesive dispensing device being uncoupled from the charger base, wherein the power source is a first rechargeable battery that provides power to the heating element,
   wherein the adhesive dispensing device includes a temperature sensor in thermal communication with the heating element, wherein the temperature sensor is coupled to the control circuit of the adhesive dispensing device, the temperature sensor is configured to detect a temperature of the nozzle,
   wherein the external power output interface is coupled to a power supply circuit configured to provide power to the external power output interface,
   wherein the adhesive dispensing device includes a handle oriented along a first axis and a barrel portion oriented along a second axis, the handle configured to mate with the interface, the barrel portion including an aperture at a first end for receiving an adhesive,
   wherein the nozzle is located at a second end of the barrel portion opposite the aperture.

2. The method of claim 1, further comprising controlling, via the control circuit, an output of at least one of the first light emitting device and the second light emitting device in response to receiving temperature data from the temperature sensor.

3. The method of claim 2, wherein the first light emitting device and the second light emitting device are multi-colored light emitting devices.

4. The method of claim 3, further comprising controlling, via the control circuit, one of the first light emitting device and the second light emitting device to output a first color light to indicate a first detected temperature.

5. The method of claim 4, wherein the first detected temperature is less than 120 degrees Celsius.

6. The method of claim 3, further comprising controlling, via the control circuit, one of the first light emitting device and the second light emitting device to output a second color light to indicate a second detected temperature.

7. The method of claim 6, wherein the second detected temperature is in a range of 120 degrees Celsius to 140 degrees Celsius.

8. The method of claim 1, wherein the power source is a rechargeable battery.

9. The method of claim 1, wherein the flow of power is provided to the heating element from the power source in response to a trigger provided on the adhesive dispensing device being actuated.

10. The method of claim 1, wherein the power supply circuit is configured to provide power to the external power output interface from a second battery.

* * * * *